United States Patent [19]

Camin et al.

[11] Patent Number: 4,680,233

[45] Date of Patent: Jul. 14, 1987

[54] SEALING MATERIAL

[75] Inventors: Geary E. Camin, Los Altos; William D. Uken, Fremont, both of Calif.

[73] Assignee: Raychem Corporation, Menlo Park, Calif.

[21] Appl. No.: 730,405

[22] Filed: May 2, 1985

[51] Int. Cl.$^4$ .............................................. B32B 27/40
[52] U.S. Cl. ............................... 428/424.6; 156/308.2; 156/329; 156/327; 156/331.7; 156/344; 427/207.1; 427/385.5; 427/387; 427/393.5; 428/425.1; 428/425.5; 428/447; 428/448; 428/451; 428/452
[58] Field of Search ...................... 428/424.6, 447, 451, 428/425.1, 425.5, 448, 452; 427/387, 393.5, 207.1, 385.5; 156/308.2, 329, 331.7, 327, 344

[56] References Cited

U.S. PATENT DOCUMENTS

| | | | |
|---|---|---|---|
| 3,065,158 | 11/1962 | Zack, Jr. ............................... | 204/154 |
| 3,179,546 | 4/1965 | Fischer ................................. | 156/272 |
| 4,064,027 | 12/1977 | Gant .................................... | 204/159.13 |
| 4,163,082 | 7/1979 | Romenesko ......................... | 428/447 |
| 4,369,284 | 1/1983 | Chen ................................... | 524/476 |

FOREIGN PATENT DOCUMENTS 2133026 7/1984 United Kingdom .

Primary Examiner—Theodore E. Pertilla
Attorney, Agent, or Firm—T. Gene Dillahunty; Herbert G. Burkard

[57] ABSTRACT

This invention provides a sealing material which comprises a layer of elastomeric sealant having a cone penetration from about 100 to 350 ($10^{-1}$ mm) and an ultimate elongation of at least 50% and disposed on a surface thereof an air drying or air curing material which sufficiently adheres to the surface of the elastomeric sealant to permit placement of the elastomeric sealant on a substrate and which reduces the surface tack of the elastomeric sealant.

21 Claims, No Drawings

SEALING MATERIAL

BACKGROUND OF THE INVENTION

This invention relates to sealant material having a cone penetration from about 100 to 350 ($10^{-1}$ mm) as determined by the standard ASTM test D217-68 and having an ultimate elongation of at least 100% as determined by standard ASTM test D638-80. Elastomeric sealants of these properties generally have very tacky surfaces and very low mechanical strength which makes these sealants difficult to handle and apply to substrates where a seal is desired. These elastomeric sealants have been used in various containers such as caps and crimp connectors in order to provide environmental seals on electrical connections and other substrates, as disclosed in U.K. patent application No. 2,133,026, and copending U.S. patent applications Ser. No. 434,011 filed Oct. 12, 1982, now U.S. Pat. No. 4,600,261, and copending U.S. patent application Ser. No. 507,433 filed June 23, 1983, now abandoned, the disclosures of which are incorporated herein by reference.

These elastomeric sealants have also been cast into a foamlike structure in order to give the elastomeric sealant certain mechanical strengths and handling qualities, such as disclosed in copending U.S. patent application Ser. No. 507,435 filed June 23, 1983, now abandoned, the disclosure of which is incorporated herein by reference. When the elastomeric sealant is cast into such a foam structure, it may be made in the form of a tape which can be applied on or around a substrate to accomplish the desired environmental seal. Due to the surface tack of the elastomeric sealant, it is desired to have a permanent backing on one side of the elastomeric sealant to provide a tack-free finish when the sealant is applied on or around a substrate. It is also desirable to be able to remove the sealant from the substrate, have the sealant remain intact and reapply the sealant to the substrate.

Due to the various properties of these elastomeric sealants, including their softness, flexibility, elongation and, in many cases, the oil content, typical backing or support materials are not suitable for use with these elastomeric sealants. Therefore, it is an object of this invention to provide in combination an elastomeric sealant and a backing material which are bonded together with a sufficient strength to provide a useful sealing material which can be applied to or around a substrate, can provide a surface of the elastomeric sealant having reduced tack, can provide mechanical protection for the elastomeric sealant and may provide means for removing the elastomeric sealant from the substrate without substantial damage to the elastomeric sealant to allow reapplying the sealant to the substrate.

DESCRIPTION OF THE INVENTION

In one aspect, this invention provides a sealing material comprising in combination:

a. an elastomeric sealant having a cone penetration from about 100-350 ($10^{-1}$ mm) and an ultimate elongation of at least 50%; and b. a backing material disposed on a surface of the elastomeric sealant comprising an air drying or air curing material which sufficiently adheres to the surface of the elastomeric sealant to permit the placement of the elastomeric sealant on a substrate and which reduces the surface tack of the elastomeric sealant.

The sealing material of this invention may have the sealant bonded to the backing material such that either the sealant or the backing material will fail cohesively before the bond between the sealant and the backing material fails. It is important to note that the sealant-to-backing bond need not be stronger than the cohesive strength of either the sealant or the backing material, but only strong enough to permit handling and installation of the sealing material on a substrate to be protected.

In another aspect, this invention provides a method of forming a sealing material which comprises applying to a surface of an elastomeric sealant having a cone penetration of about 100-350 ($10^{-1}$ mm) a backing material comprising an air drying or air curing material which sufficiently adheres to the surface of the elastomeric sealant and provides means for installation of the elastomeric sealant on a substrate and which reduces the surface tack of the elastomeric sealant.

In another aspect, this invention provides a method of protecting a substrate by applying to a substrate a sealing material comprising:

a. an elastomeric sealant having a cone penetration from about 100-350 ($10^{-1}$ mm) and an ultimate elongation of at least 50%; and b. a backing material disposed on a surface of the elastomeric sealant comprising an air drying or air curing material which sufficiently adheres to the surface of the elastomeric sealant to permit the placement of the elastomeric sealant on a substrate and which reduces the surface tack of the elastomeric sealant.

The elastomeric sealant useful in the invention has a cone penetration from about 100 to about 350 ($10^{-1}$ mm) and elongation of at least 50%, as determined by the ASTM tests noted above. For many uses, a preferred sealant may have a cone penetration of about 115-325 ($10^{-1}$ mm) and may be about 120-300 ($10^{-1}$ mm). The elongation of the sealant material may be at least about 100% or at least about 150%. In addition, many of the elastomeric sealants useful in this invention have other properties that make them useful as environmental sealants, particularly against moisture. These other properties include high surface tackiness, which enhances its ability to seal effectively against the surface of a substrate, and elastic modulus which allows the elastomeric sealant to deform over irregular shapes and maintain a good seal with the surface of the substrate. These properties may also provide the characteristic of these elastomeric sealants of having a capability of being removed from the surface of the substrate and replaced on the surface of the substrate a substantial number of times without a significant damage to the sealant or significant decrease in the effectiveness of the sealing and protection of the substrate by the sealant when reapplied to the substrate.

The elastomeric sealants useful in this invention include polysiloxanes, polyurethanes, polybutyls, triblock copolymers and the like. The polysiloxane sealants useful in this invention typically have about 10 to 90% by weight crosslinked polysiloxane and about 90 to 10% by weight uncrosslinked polysiloxane oil. These polysiloxane sealants are prepared by crosslinking polysiloxane liquids to the desired degree by conventional methods to produce the sealant properties outlined above. Examples of such polysiloxane liquids and their crosslinking are illustrated in U.S. Pat. Nos. 4,163,082; 4,064,027; 3,179,546 and 3,065,158 the disclosures of which are incorporated herein by reference. An example of such material is MTV Silicone Gel V-120, available from SWS Silicones Corporation.

The polyurethanes useful in this invention may contain from 20 to 80% crosslinked polyurethane and 20 to 80% oil, such as a mineral oil. Examples of the polyurethane elastomeric sealant materials are described in U.S. patent aplications Ser. No. 507,435, filed June 23, 1983; Ser. No. 434,011 filed Oct. 12, 1982; and Ser. No. 504,000, filed June 13, 1983, now U.S. Pat. No. 4,634,207 the disclosures of which is incorporated herein by reference.

Examples of the polyurethane elastomeric materials useful in this invention are described in U.S. patent application Ser. No. 646,555, filed Aug. 31, 1984, now abandoned, the disclosure of which is incorporated herein by reference.

Examples of triblock copolymer materials useful in this invention are described in U.S. Pat. No. 4,369,284, the disclosure of which is incorporated herein by reference. Other polymeric materials having the desired cone penetration, elongation and other properties are also useful in this invention.

The backing material useful in this invention is any air drying or air curing material which will adhere to the surface of the elastomeric sealant sufficient to permit placement of the elastomeric sealant on a substrate and which reduces the surface tack of the elastomeric sealant. In addition, the backing material and the solvent or carrier in which the backing material is dissolved or dispersed must both be compatible with the surface of the elastomeric sealant. The elastomeric sealants useful in this invention generally have an uncrosslinked oil compound and the surface of the elastomeric sealant is usually oily to some extent, the backing material and the solvent or carrier will usually be a hydrocarbon-type of material or a material which is compatible with oils and hydrocarbons. Non-hydrocarbon solvents or carriers can be used provided they contain emulsifiers or other materials which make them compatible with the surface of the elastomeric sealant.

The backing material should reduce or eliminate the surface tackiness of the elastomeric sealant after the backing material has dried or cured. If the backing material has little or no elasticity it may eliminate the surface tackiness when in the original position or shape but may separate into strips or particles when the elastomeric sealant is stretched and thereby expose the tacky surface of the elastomeric sealant. This can be a useful phenomenon in some applications. In other applications it may be desirable to use a backing material which also has a high elasticity so that when the elastomeric sealant is stretched to conform to a substrate, the backing material can also conform without breaking, separating or exposing the tacky surface of the elastomeric sealant. Due to the very high elongation of many of the elastomeric sealants useful in this invention, it may be difficult to match this elongation with a backing material. However, this also can be a useful feature in that the elastic limit of the backing material can serve to protect the elastomeric sealant to prevent it from being torn or damaged.

The backing materials of this invention may be applied to the surface of the elastomeric sealant in any conventional manner such as spraying, rolling, brushing, dipping, etc. Multiple coats of the backing material may be applied and backing materials of the same or different properties may be applied to different surfaces of the elastomeric sealant, depending on the properties and end use requirements for the sealing material.

The elastomeric sealants useful in this invention and the sealing material made according to this invention may contain various optional ingredients such as flame retardants, corrosion inhibitors, antioxidants, UV light stabilizers, fungicides and other biocides, pigments, fillers to enhance or decrease thermal or electrical conductivity and fillers to adjust density or other physical propeties. Such additives or fillers also may be used to regulate or affect the rate of exatent of cure and crosslinking and affect the overal cost of the final composition.

The sealing material of this invention can be used for any conventional surface protection by applying the elastomeric sealant to the surface to be protected with the support material providing mechanical application means and protection for the elastomeric sealant. The sealing material of this invention can be applied as sheets, tapes and in other forms to provide environmental protection for the substrate.

This invention can be illustrated by the following examples.

EXAMPLE 1

In this example an organopolysiloxane was prepared by UV curing of a material available as KE104 Gel from Shin-Etsu which is a two-part, polyvinylmethylsiloxane and polymethylhydridesiloxane trimethyl termianted, and which was cast into a flexible matrix in accordance with copending application Ser. No. 507,435 filed June 23, 1983 and heat cured at 150° C. to a cone penetration of 260 and an ultimate elongation of 450%. A strip of the polysiloxane elastomeric sealant was aerosal sprayed with a polyvinylchloride material dispersed in methyalenechloride and tolulene solvents. The coating was sufficient to completely cover the surface of the polysiloxane elastomeric sealant. The coating was allowed to air dry after which it was found that the strip of polysiloxane elastomeric sealant had the polyvinylchloride backing material bonded thereto sufficiently to provide good handling characteristics and allow installation thereof on substrates. The surface was essentially dry to the touch. The polyvinylchloride backing material exhibited some elasticity which allowed the sealing material to conform to some substrates. Another strip of the polysiloxane elastomeric sealant was coated with a silicone elastomer prepolymer which was in a hydrocarbon solvent and contained a moisture activated catalyst, available from Petrarch Systems as Glassclad SE Water Repellent Coating. The coating air cured to essentially a tack-free surface and appeared to adhere well enough to the polysiloxane to allow handling and installation on substrates.

EXAMPLE 2

In this example a polyurethane elastomeric sealant prepared in accordance with copending application Ser. No. 507,435 filed June 23, 1983 was prepared to a cone penetration of 260 ($10^{-1}$ mm) and an ultimate elongation of 850%. A strip of the polyurethane elastomeric sealant was sprayed with a clear lacquer in a hydrocarbon solvent and allowed to air dry. The surface was tack-free. The lacquer had very little elongation and cracked when the elastomeric sealant was stretched, but the lacquer coating adhered well enough to the surface of the elastomeric sealant to allow handling and application to sustrates. If the elastomeric sealant were stretched to a significant degree, the cracks in the lacquer became wide enough that the surface tackiness of the polyurethane elastomeric sealant was exposed.

It is claimed:

1. A sealing material comprising in combination:
   a. an elastomeric sealant comprising a polysiloxane, a polyurethane, a polybutyl or a triblock copolymer and having a cone penetration from about 100–350 ($10^{-1}$ mm) and an ultimate elongation of at least 50%; and
   b. a backing material disposed on a surface of the elastomeric sealant comprising an air drying or air curing material which is liquid, dissolved in a solvent or dispersed in a carrier and which, when dried or cured, sufficiently adheres to the surface of the elastomeric sealant and provides means for installation of the elastomeric sealant on a substrate and which reduces the surface tack of the elastomeric sealant.

2. A sealing material according to claim 1 wherein the elastomeric sealant comprises a polyurethane.

3. A sealing material according to claim 1 wherein the elastomeric sealant comprises an organopolysiloxane.

4. A sealing material according to claim 1 wherein the elastomeric sealant comprises a triblock copolymer.

5. A sealing material according to claim 1 wherein the backing material comprises a lacquer.

6. A sealing material according to claim 1 wherein the backing material comprises polyvinylchloride.

7. A sealing material according to claim 3 wherein the backing material comprises polyvinylchloride.

8. A method of forming a sealing material which comprises applying to a surface of an elastomeric sealant comprising a polysiloxane, a polyurethane, a polybutyl or a triblock copolymer and having a cone penetration of about 100–350 ($10^{-1}$ mm) a backing material comprising an air drying or air curing material which is liquid, dissolved in a solvent or dispersed in a carrier and which, when dried or cured, sufficiently adheres to the surface of the elastomeric sealant and provides means for installation of the elastomeric sealant on a substrate and which reduces the surface tack of the elastomeric sealant.

9. A method according to claim 8 wherein the elastomeric sealant comprises a polyurethane.

10. A method according to claim 8 wherein the elastomeric sealant comprises an organopolysiloxane.

11. A method according to claim 8 wherein the elastomeric sealant comprises a triblock copolymer.

12. A method according to claim 8 wherein the backing material comprises a lacquer.

13. A method according to claim 8 wherein the backing material comprises polyvinylchloride.

14. A method according to claim 10 wherein the backing material comprises polyvinylchloride.

15. A method of protecting a substrate by applying to a substrate a sealing material comprising:
   a. an elastomeric sealant comprising a polysiloxane, a polyurethane, a polybutyl or a triblock copolymer and having a cone penetration from about 100–350 ($10^{-1}$ mm) and an ultimate elongation of at least 50%; and
   b. a backing material disposed on a surface of the elastomeric sealant comprising an air drying or air curing material which is liquid, dissolved in a solvent or dispersed in a carrier and which, when dried or cured, sufficiently adheres to the surface of the elastomeric sealant and provides means for installation of the elastomeric sealant on a substrate and which reduces the surface tack of the elastomeric sealant.

16. A method according to claim 15 wherein the elastomeric sealant comprises a polyurethane.

17. A method according to claim 15 wherein the elastomeric sealant comprises an organopolysiloxane.

18. A method according to claim 15 wherein the elastomeric sealant comprises a triblock copolymer.

19. A method according to claim 15 wherein the backing material comprises a lacquer.

20. A method according to claim 15 wherein the backing material comprises polyvinylchloride.

21. A method according to claim 17 wherein the backing material comprises polyvinylchloride.

* * * * *